United States Patent
Zeiler et al.

(10) Patent No.: US 11,425,856 B2
(45) Date of Patent: *Aug. 30, 2022

(54) ZERO TURN RADIUS MOWER WITH CUTTING BLADE CONTROL

(71) Applicant: Briggs & Stratton, LLC, Wauwatosa, WI (US)

(72) Inventors: Jeffrey Zeiler, Pewaukee, WI (US); Robert J. Koenen, Pewaukee, WI (US)

(73) Assignee: Briggs & Stratton, LLC, Wauwatosa, WI (US)

( * ) Notice: Subject to any disclaimer, the term of this patent is extended or adjusted under 35 U.S.C. 154(b) by 84 days.

This patent is subject to a terminal disclaimer.

(21) Appl. No.: 16/874,456

(22) Filed: May 14, 2020

(65) Prior Publication Data

US 2020/0267895 A1 Aug. 27, 2020

Related U.S. Application Data

(63) Continuation of application No. 15/868,662, filed on Jan. 11, 2018, now Pat. No. 10,687,464.

(Continued)

(51) Int. Cl.
*A01D 34/00* (2006.01)
*A01D 34/78* (2006.01)
*A01D 69/02* (2006.01)
*A01D 34/66* (2006.01)
*A01D 34/82* (2006.01)
*A01D 101/00* (2006.01)

(52) U.S. Cl.
CPC .......... *A01D 34/006* (2013.01); *A01D 34/66* (2013.01); *A01D 34/78* (2013.01); *A01D 69/02* (2013.01); *A01D 34/824* (2013.01); *A01D 2101/00* (2013.01)

(58) Field of Classification Search
CPC .... A01D 34/006; A01D 34/008; A01D 34/78; A01D 69/02
See application file for complete search history.

(56) References Cited

U.S. PATENT DOCUMENTS 5,402,626 A 4/1995 Zinck
5,497,604 A * 3/1996 Lonn ................ A01D 34/475
56/10.2 H (Continued)

FOREIGN PATENT DOCUMENTS

DE 41 37 162 A1 5/1993
WO WO-2016002081 A * 1/2016 ............ A01D 34/60

(Continued)

*Primary Examiner* — Alicia Torres
(74) *Attorney, Agent, or Firm* — Foley & Lardner LLP

(57) ABSTRACT

A zero turn radius mower including a pair of rear drive wheels, a mowing deck including multiple cutting blades, an electric storage battery, a pair of electric wheel motors each operable to rotate one of the rear drive wheels, multiple electric blade motors each operable to rotate one of the multiple cutting blades, and a master controller in communication with each of the pair of wheel motors and the multiple blade motors. The master controller is operable to control a rotational speed of each of the pair of wheel motors and the multiple blade motors. The master controller is operable to stop rotation of the cutting blades when the wheel motors are operating below a threshold speed.

5 Claims, 3 Drawing Sheets

Related U.S. Application Data

(60) Provisional application No. 62/445,390, filed on Jan. 12, 2017.

(56) References Cited

U.S. PATENT DOCUMENTS

| | | | |
|---|---|---|---|
| 5,502,957 A | 4/1996 | Robertson | |
| 6,591,593 B1 | 7/2003 | Brandon et al. | |
| 6,688,090 B2 | 2/2004 | Velke et al. | |
| 8,240,414 B2 | 8/2012 | Sasahara et al. | |
| 8,657,041 B2 | 2/2014 | Ishii et al. | |
| 8,668,036 B2 | 3/2014 | Wyatt et al. | |
| 8,668,043 B2 | 3/2014 | Yang et al. | |
| 8,966,870 B2 | 3/2015 | Mackinnon et al. | |
| 9,210,839 B2 | 12/2015 | Schygge et al. | |
| 9,282,695 B2 | 3/2016 | Goto | |
| 9,380,741 B2 | 7/2016 | Drew et al. | |
| 9,699,965 B2 | 7/2017 | Schygge et al. | |
| 9,840,143 B1 | 12/2017 | Keller et al. | |
| 9,950,621 B2 | 4/2018 | Dwyer | |
| 9,980,434 B1 | 5/2018 | Brown | |
| 10,058,031 B1 | 8/2018 | Brown et al. | |
| 10,091,936 B2 | 10/2018 | Laurin et al. | |
| 10,093,169 B1 | 10/2018 | Keller et al. | |
| 10,292,326 B2 | 5/2019 | Tanabe et al. | |
| 10,327,392 B2 | 6/2019 | Conrad et al. | |
| 10,687,464 B2 * | 6/2020 | Zeiler | A01D 34/66 |
| 2005/0230168 A1 | 10/2005 | Fillman et al. | |
| 2009/0065273 A1 | 3/2009 | Wyatt et al. | |
| 2009/0201650 A1 | 8/2009 | Hauser et al. | |
| 2012/0159916 A1 | 6/2012 | Ishii et al. | |
| 2012/0227368 A1 | 9/2012 | Koike et al. | |
| 2012/0260617 A1 | 10/2012 | Gilpatrick | |
| 2013/0047565 A1 | 2/2013 | Shida et al. | |
| 2013/0110351 A1 | 5/2013 | Stone et al. | |
| 2013/0173117 A1 | 7/2013 | Bertsch et al. | |
| 2013/0268165 A1 | 10/2013 | Hashima et al. | |
| 2014/0165524 A1 | 6/2014 | Schygge et al. | |
| 2015/0006025 A1 | 1/2015 | Rhoades et al. | |
| 2015/0214864 A1 | 7/2015 | Sopko | |
| 2016/0183451 A1 | 6/2016 | Conrad et al. | |
| 2018/0192580 A1 | 7/2018 | Zeiler et al. | |
| 2018/0235149 A1 | 8/2018 | Ito et al. | |
| 2018/0249630 A1 | 9/2018 | Mullet et al. | |
| 2018/0310471 A1 | 11/2018 | Pellenc | |
| 2019/0230850 A1 | 8/2019 | Johnson et al. | |
| 2019/0269067 A1 | 9/2019 | Fukano et al. | |
| 2020/0163275 A1 | 5/2020 | Zhao et al. | |
| 2020/0353977 A1 | 11/2020 | Davies et al. | |

FOREIGN PATENT DOCUMENTS

| | | |
|---|---|---|
| WO | WO-2017/109319 | 6/2017 |
| WO | WO-2017/222368 | 12/2017 |

* cited by examiner

ZERO TURN RADIUS MOWER WITH CUTTING BLADE CONTROL

CROSS-REFERENCE TO RELATED APPLICATION

The present application is a continuation of U.S. patent application Ser. No. 15/868,662, filed Jan. 11, 2018, which claims priority to U.S. Provisional Patent Application Ser. No. 62/445,390 filed Jan. 12, 2017, the entire disclosures of both of which are incorporated herein by reference.

BACKGROUND

The present disclosure relates to a zero turn radius (ZTR) mower. More specifically, the present disclosure relates to a ZTR mower that includes an electric powertrain including a one or more electric storage batteries, a plurality of electric wheel drive motors and a plurality of electric blade motors.

ZTR mowers have become a popular type of lawn mowing equipment and include a pair of independently driven rear wheels. The independent drive of the rear wheels allows the ZTR mower to be extremely maneuverable and operable at relative high mowing speeds. ZTR mowers are popular with landscaping companies and homeowners that have a substantial amount of acreage to mow on a regular basis.

ZTR mowers typically include an internal combustion engine that transfers drive power through hydrostatic transaxles to the pair of drive wheels. Each of the drive wheels are independently driven at different speeds and even in different directions, which creates the extreme maneuverability of the ZTR mower.

Recently, outdoor power equipment manufacturers, like many other industries, have embraced the trend of utilizing electric storage batteries as an alternate power supply to gas powered engines. In order to use a battery power supply, the hydrostatic drive motors in ZTR motors must be removed and replaced by separate electric wheel drive motors for each of the two rear drive wheels as well as one or more electric motors for rotating the plurality of mowing blades. Since multiple electric motors must be utilized, a complex control system must be employed to accurately control and synchronize the rotational speed of the electric blade motors and the speed and direction of the electric wheel motors. The present disclosure provides a control system for controlling the rotational speed of all of the electric motors utilized in an electric ZTR mower.

SUMMARY

One embodiment of the present disclosure is a ZTR mower including a pair of rear drive wheels, a mowing deck including multiple cutting blades, an electric storage battery, a pair of electric wheel motors each operable to rotate one of the rear drive wheels, multiple electric blade motors each operable to rotate one of the multiple cutting blades, and a master controller in communication with each of the pair of wheel motors and the multiple blade motors. The master controller is operable to control a rotational speed of each of the pair of wheel motors and the multiple blade motors. The master controller is operable to stop rotation of the cutting blades when the wheel motors are operating below a threshold speed.

Another embodiment of the present disclosure is a ZTR mower including a pair of rear drive wheels, a mowing deck including multiple cutting blades, an electric storage battery, a pair of electric wheel motors each operable to rotate one of the rear drive wheels, multiple electric blade motors each operable to rotate one of the multiple cutting blades, and a master controller in communication with each of the pair of wheel motors and the multiple blade motors. The master controller is operable to control a rotational speed of each of the pair of wheel motors and the multiple blade motors. The master controller is operable to send voltage pulses to the multiple blade motors.

Another embodiment of the present disclosure is a ZTR mower including a pair of drive wheels, a mowing deck including multiple cutting blades, an electric storage battery, an electric first motor, an electric second motor, and a single master controller. The second motor is positioned apart from the first motor. The master controller is in communication with the first motor and the second motor to control a rotational speed of the first motor and to a control a rotational speed of the second motor.

BRIEF DESCRIPTION OF THE DRAWINGS

The drawings illustrate the best mode presently contemplated of carrying out the disclosure. In the drawings.

DETAILED DESCRIPTION

Figure 1:
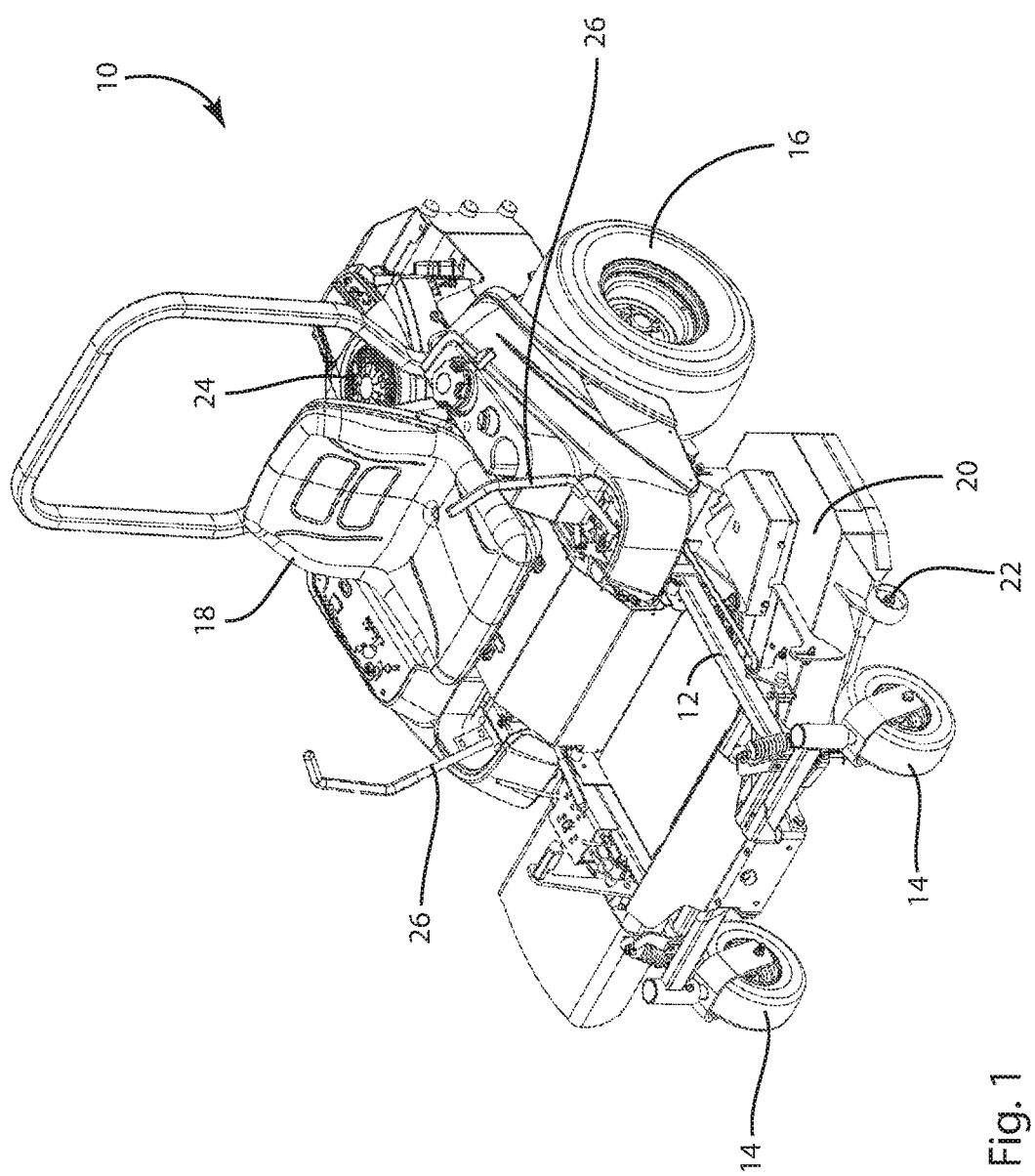
FIG. 1 is an isometric view of a ZTR mower incorporating an internal combustion engine according to some embodiments.

FIG. 1 illustrates an isometric view of a zero turn radius (ZTR) mower as is currently available from numerous manufacturers. The ZTR mower 10 includes a main vehicle frame 12, front castor wheels 14, a pair of rear drive wheels 16 and a seat 18. The ZTR mower 10 includes a mower deck 20 that includes a cutting assembly positioned between the front castor wheels 14 and the rear drive wheels 16. The mower deck 20 includes front castor wheels 22 that aid in maintaining the height of the mower deck 20 during cutting operations. In past embodiments, such as shown in FIG. 1, the ZTR mower 10 included an internal combustion engine 24 that provides the required motive force to drive the rear wheels 16 as well the rotate the multiple mower blades contained within the mower deck 20. The drive assembly typically includes separate drive assemblies to control the rear drive wheels 16 independently. The drive wheels are controlled through the position of a pair of control paddles 26. The independent control of the drive wheels 16 allows the ZTR mower to maneuver in a way to increase the usability of the ZTR mower. Although the pair of control paddles 26 are shown in the drawing figures, the control paddles 26 could be replaced by a steering wheel, a pair of joysticks, a single joystick or any other device or mechanism that would indicate a user desired direction of movement for the ZTR mower 30.

Although the prior art embodiment shown in FIG. 1 functions well utilizing the internal combustion engine 24, new designs are being created to replace the internal combustion engine 24 with an all-electric drivetrain that includes one or more lithium ion battery packs that provide power to multiple electric drive motors.

Figure 2:
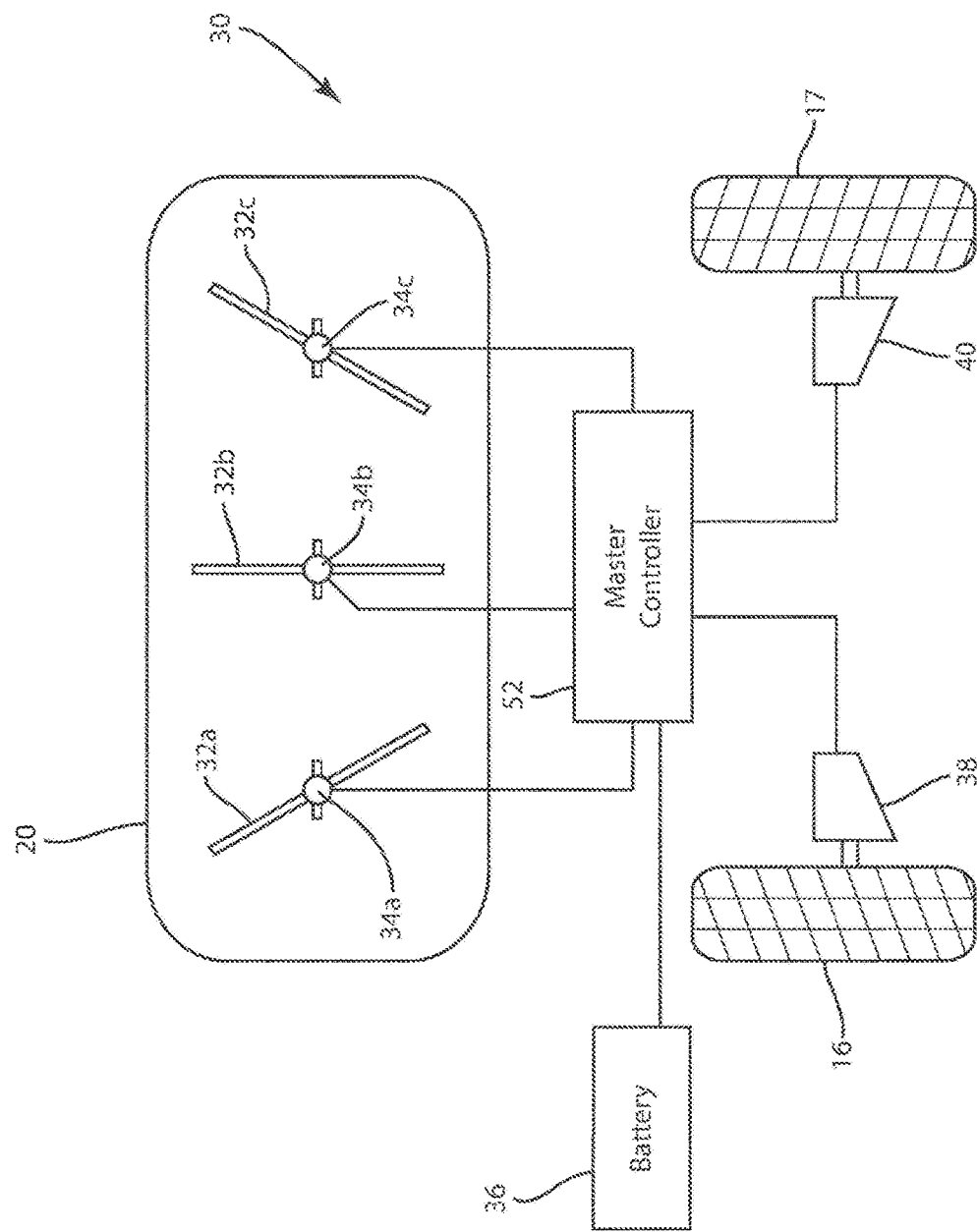
FIG. 2 is a schematic illustration of a ZTR mower utilizing an electric powertrain including a battery power supply and electric drive motors according to some embodiments.

FIG. 2 is a schematic illustration of the electric drivetrain contemplated in accordance with the present disclosure to create an all-electric ZTR mower 30. As shown in the embodiment of FIG. 2, the mower deck 20 encloses three sets of cutting blades 32 (32a, 32b and 32c). The cutting blades are oriented such that the cutting blade 32a is the outer cutting blade on the left side of the mower deck 20 and the cutting blade 32c is the outer cutting blade on the right side of the mower deck 20. In the embodiment shown, a single center cutting blade 32b is positioned between the pair of outer cutting blades 32a and 32c. However, additional cutting blades could be included in the mower deck between the outer cutting blades.

Each of the cutting blades 32 is driven by an electric cutting blade motor 34 (34a, 34b and 34c). The cutting blade motors 34 are each driven by a battery power supply 36 that is connected to the cutting blade motors 34 though a master controller 52, as will be discussed in greater detail below. Although the battery 36 is shown in FIG. 2 as a single component, it is contemplated that the battery power supply 36 would include multiple battery packs connected in parallel to provide an output voltage. The multiple battery packs are contemplated as being lithium ion battery packs that included twenty individual cells each having a maximum output of 4.2 V for a maximum output voltage of approximately of 84 volts and a nominal voltage of 74 volts for the entire pack. Other configurations and voltages are contemplated for the battery power supply 36 and the above describes only one currently contemplated embodiment.

The electric ZTR mower 30 shown in FIG. 2 further includes a first rear wheel drive motor 38 and a second rear wheel drive motor 40. The first wheel motor 38 drives a first rear drive wheel 16 while the second wheel motor 40 drives the rotation of a second rear drive wheel 17. Both of the first and second wheel motors 38, 40 are powered by the battery power supply 36 through the same master controller 52.

As can be understood in FIG. 2, the electric ZTR mower 30 includes five separate and independent electric motors. Three of the electric motors 34 are used to rotate the cutting blades 32 while wheel motors 38 and 40 are used to independently operate the rear drive wheels 16 and 17. The rotational speed and rotational direction of each of the electric drive motors 34, 38 and 40 must be controlled through separate control signals since the motors operate independently from each other.

Figure 3:
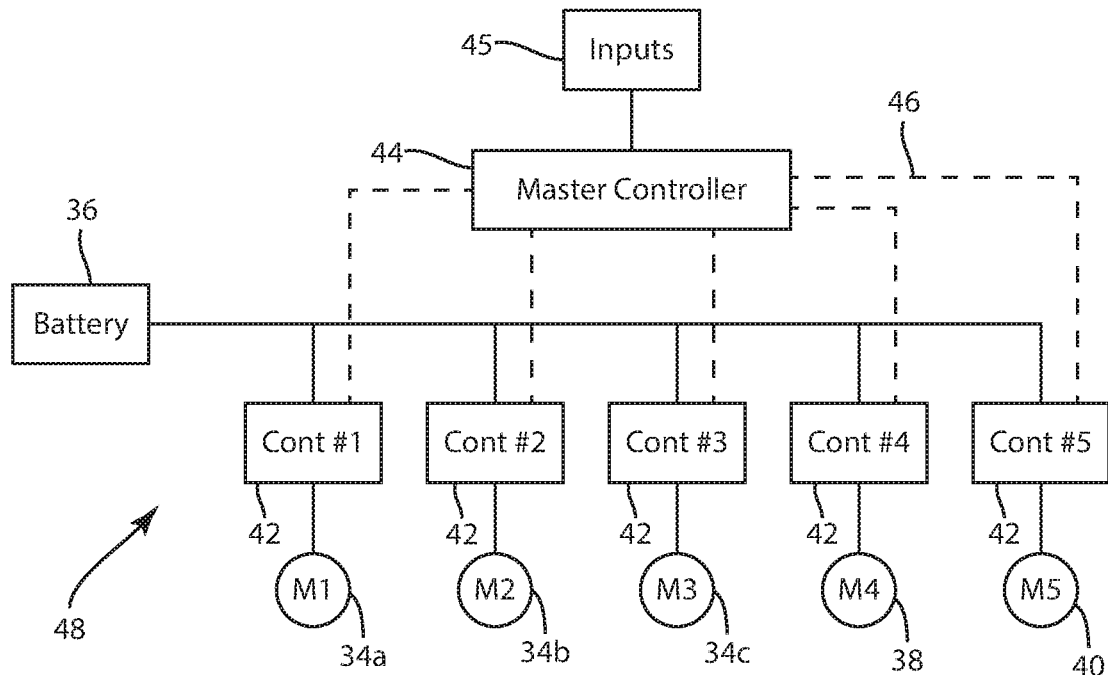
FIG. 3 is schematic illustration of the control connections between the multiple controllers for each of the electric drive motors and a master controller according to the prior art.

FIG. 3 illustrates a conventional, prior art control technique that was utilized to control each of the individual electric motors in currently available electric ZTR mowers. As shown in FIG. 3, each of the blade motors 34a, 34b, 34c and each of the wheel motors 38 and 40 includes a separate controller 42. The separate controllers 42 independently control the rotational speed and rotational direction of the individual motor. Each of the controllers 42 receives power from the battery 36 and supplies the electrical power from the battery 36 to the individual electric motor as needed. In the typical arrangement shown in FIG. 3, a master controller 44 includes multiple control lines 46 that provide the operational control signals for each of the individual controllers 42. The master controller 44 receives user inputs 45, which can be blade speed, drive speed, drive direction and other related signals and interprets these signals. The user input signals can come from the control paddles 26 and other input selectors contained on the ZTR mower. Once the input signals from the user have been interpreted, the master controller 44 sends out control signals along the control lines 46 to the individual motor controllers 42. The motor controllers, in turn, generate motor control signals that control the rotational speed of the cutting blades and the speed of the drive wheels. As can be understood in the embodiment shown in FIG. 3, the control system 48 includes five separate motor controllers 42 and a master controller 44. In past systems, the individual controllers 42 did not communicate with each other and only received command signals from the master controller 44. The master controller 44, in turn, did not have the capability of controlling the operation of the motors 34, 38 and 40 in a coordinated manner as may be desired.

Figure 4:
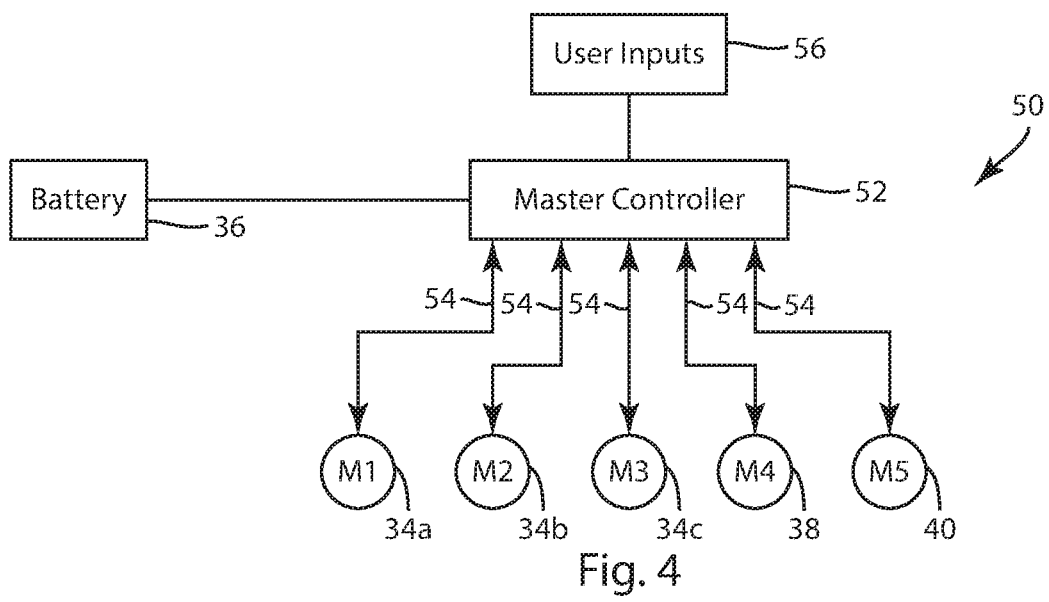
FIG. 4 is an electric schematic illustration showing the implementation of the present disclosure utilizing a single controller to control the operation of multiple electric drive motors according to some embodiments.

FIG. 4 illustrates a schematic implementation of a control system 50 contemplated in accordance with the present disclosure. In the embodiment of FIG. 4, the three cutting blade motors 34a, 34b and 34c, as well as the pair of wheel motors 38 and 40 are each controlled by the same, single master controller 52 through a series of control lines 54. The master controller 52 is able to independently control the speed and direction of rotation of each of the wheel motors 38 and 40 and the speed of rotation of the cutting blade motors 34. The master controller 52 receives user inputs 56 from various differing components of the electric ZTR mower. These user inputs may be related to the position of the control paddles 26, desired rotational speeds for the mower blades selected by the user from a control panel on the mower or any other input that may be related to the operation speed or direction of either the three blade motors 34 or the wheel motors 38, 40.

Since the position of the control paddles 26 is needed to control steering and speed through the relative drive speeds of the wheel motors 38 and 40, position sensors must be utilized to provide an electric signal to the master controller as to the position of the control paddles 26. These position sensors can be located in any position in which the position sensors can detect the movement and position of the control paddles 26. The position sensors would communicate directly to the master controller 52 and would thus allow "drive by wire" capabilities for the electric ZTR mower. The control paddles could be replaced with other types of controls, such as a pair of joysticks. However, it is believed that the function and overall acceptance of the ZTR mower is due in part to the pair of control paddles 26 and such configuration is contemplated in the present disclosure. No matter the control device used by the user, signals are directed to the master controller 52 to indicate both the speed and direction of rotation of the rear wheels. These signals are received and interpreted by the single master controller 52.

As can be understood in FIG. 4, utilizing a single controller 52 to control the operation of the five electric drive motors allows the master controller 52 to more precisely coordinate the operation of the electric motors to enhance the operability of the electric ZTR mower 30. Such coordination was not feasible in the configuration shown in FIG. 3, which utilized the master controller 44 and the five separate motor controllers 42. Such coordination allows the master controller 52 to carry out various enhancements to the normal operation of a ZTR mower, as will be described below.

In a first illustrative example of the enhanced operation of the ZTR mower, the controller 52 could coordinate the rotational speed of the blade motors 34 based upon the operational speed of the wheel motors 38, 40. For example, when the wheel motors 38, 40 are operating at a higher rate of speed, the master controller 52 would increase the rotational speed of the blade motors 34 to enhance the quality of cut when the ZTR mower 30 is moving more quickly along the ground. The master controller 52 would slow the rotational speed of the blade motors 34 when the speed of rotation of the wheel motors slow, since the ZTR mower would be moving more slowly along the ground. Decreasing the operating speed of the blade motors 34 based on the speed of mowing would reduce the power draw of the blade motors 34 while still maintaining a desired quality of cut.

In another illustrative example of the operation of the ZTR mower, the master controller 52 could turn off the blade motors 34 when the wheel motors 38, 40 are operating at a very low speed, indicating that the ZTR mower is either idling or stopped. The master controller 52 would set a minimum speed threshold for the wheel motors 38, 40 and if the speed of these motors falls below the minimum threshold, the blade motors 34 could either be turned off entirely or allowed to rotate at a greatly reduced speed. By terminating operation of the blade motors 34 when the mower is not moving, the master controller 52 would enhance the battery life 36 by operating the blade motors 34 only as fast or when needed.

In another illustrative example, the master controller 52 could send "pulsed" voltages to the blade motors 34 to reduce the power consumption of each of the blade motors 34 rather than simply supplying a constant voltage to the blade motors 34. In such operation, the voltage from the battery supply would be pulsed successively between the blade motors 34 and the system would rely upon the rotational inertia of the cutting blades to keep the blades rotating during the periods of time when the blade is not under active drive by the blade motor 34. This configuration would reduce the voltage draw since voltage would not be applied to the blade motor 34 continuously.

In yet another illustrative example, the master controller 52 can receive torque feedback from each of the three blade motors 34 and can determine which of the three blade motors 34 is under the heaviest load. Such unbalanced loading may result during sharp turning of the ZTR mower, since during such sharp turns, the outer cutting blade is traveling over the grass being cut at a much higher rate of speed as compared to the inner cutting blade. As an example, if the user indicates a desire, through the position of the control paddles 36, to turn sharply to the left as viewed in FIG. 2, the speed of the motor 38 is slowed or reversed and the speed of the motor 40 is increased. During this sharp left turn, the outer cutting blade 32a would be covering much less ground than the outer cutting blade 32c. Therefore, it would be desirable to increase the rotational speed of the outer cutting blade 32c relative to the outer cutting blade 32a. Since the master controller 52 would receive all of the inputs from the blade motors 34, the master controller 52 could quickly and responsively control the rotating speed of the cutting blades 32a and 32c through the respective blade motors 34.

The master controller 52 will also know the turning angle of the ZTR mower since the master controller 52 would receive signals related to the position of the control paddles 26, which are used to control the operational speed of the wheel motors 38, 40. Based on the turning angle, the master controller 52 would increase the speed of the blade motor on the side with the faster moving drive wheel while the opposite side may call for a reduction in blade speed since it might be moving very slowly or even standing in place. The measured blade motor torque could also identify an unbalanced load on the mower blades, which may call for speeding up one of the blade motors and possibly slowing down the other blade motor. Further, the master controller 52 could slow down the wheel motors 38, 40 to allow the blade motors to keep up with the cutting load.

As can be understood in the embodiment of FIG. 4, the battery 36 provides power for both the master controller and each of the individual drive motors. The connection between the battery 36 and the drive motors 34, 38 and 40 could be varied depending upon the specific implementation of the present disclosure.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A zero turn radius (ZTR) mower, comprising:
a pair of rear drive wheels;
a mowing deck including a plurality of cutting blades;
an electric storage battery;
a pair of electric wheel motors each operable to rotate one of the rear drive wheels;
a plurality of electric blade motors each operable to rotate one of the plurality of cutting blades; and
a master controller in communication with each of the pair of wheel motors and the plurality of blade motors, wherein the master controller is operable to control a rotational speed of each of the pair of wheel motors and the plurality of blade motors and wherein the master controller is operable to stop rotation of the cutting blades when the wheel motors are operating below a threshold speed.

2. The ZTR mower of claim 1, wherein the master controller is operable to receive user inputs and to control the rotational speed of the pair of wheel motors based on the user inputs.

3. The ZTR mower of claim 1, wherein the master controller is operable to adjust the rotational speed of the blade motors based on the rotational speed of the wheel motors.

4. The ZTR mower of claim 1, wherein the master controller is operable to adjust the rotational speed of the plurality of blade motors separately such that the cutting blades selectively rotate at different rotational speeds.

5. The ZTR mower of claim 4, wherein the plurality of blade motors include a first outer blade motor and a second outer blade motor positioned on opposite sides of the mowing deck, wherein the master controller operates the first outer blade motor at a higher rotational speed than the second outer blade motor when the mower turns in a first direction and operates the first outer blade motor at a lower rotational speed than the second outer blade motor when the mower turns in a second direction.

* * * * *